United States Patent
Onishi et al.

(10) Patent No.: US 11,791,500 B2
(45) Date of Patent: *Oct. 17, 2023

(54) APPARATUS AND METHOD FOR MANUFACTURING LAMINATE FOR SECONDARY BATTERY

(71) Applicant: ZEON CORPORATION, Tokyo (JP)

(72) Inventors: Kazuyuki Onishi, Tokyo (JP); Hiroshi Omori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 611 days.

This patent is subject to a terminal disclaimer.

(21) Appl. No.: 16/979,858

(22) PCT Filed: Mar. 20, 2019

(86) PCT No.: PCT/JP2019/011902
§ 371 (c)(1),
(2) Date: Sep. 11, 2020

(87) PCT Pub. No.: WO2019/188724
PCT Pub. Date: Oct. 3, 2019

(65) Prior Publication Data
US 2021/0028495 A1    Jan. 28, 2021

(30) Foreign Application Priority Data
Mar. 30, 2018   (JP) ................. 2018-069952

(51) Int. Cl.
*H01M 10/0585* (2010.01)
*H01M 50/403* (2021.01)
(Continued)

(52) U.S. Cl.
CPC ... *H01M 10/0585* (2013.01); *H01M 10/0404* (2013.01); *H01M 50/40* (2021.01);
(Continued)

(58) Field of Classification Search
CPC ........ H01M 10/0404; H01M 10/0585; H01M 50/403; H01M 50/46; Y10T 156/1025; B32B 37/0046; B32B 3/28
See application file for complete search history.

(56) References Cited

U.S. PATENT DOCUMENTS 11,482,723 B2 * 10/2022 Omori ............... H01M 10/0481

FOREIGN PATENT DOCUMENTS

| JP | 2016152178 A | 8/2016 |
|----|--------------|--------|
| JP | 2017063002 A | 3/2017 |
| JP | 2017063004 A | 3/2017 |

OTHER PUBLICATIONS

Nov. 22, 2021, the Extended European Search Report issued by the European Patent Office in the corresponding European Patent Application No. 19778166.9.

(Continued)

*Primary Examiner* — Carson Gross
(74) *Attorney, Agent, or Firm* — KENJA IP LAW PC (57) ABSTRACT

The present disclosure provides an efficient technique for manufacturing laminates for secondary batteries each having a separator and electrodes, which in turn enables continuous and efficient manufacturing of laminate type secondary batteries. An apparatus for manufacturing a laminate for a secondary battery of the present disclosure includes an electrode roll of a long electrode web rolled into a roll shape; a separator roll of a long separator web rolled into a roll shape; a lamination mechanism for laminating the separator web fed out from the separator roll and the electrode web fed out from the electrode roll while causing the separator web to be bent or curled to form a protruding portion extending across an entire width of the separator web so that the protruding portion is disposed so as to oppose to the electrode web; and a cutting mechanism for cutting at least the (Continued)

electrode web portion in a laminated article of the separator web and the electrode web at a position where the protruding portion has been provided.

10 Claims, 9 Drawing Sheets

(51) Int. Cl.
| | | |
|---|---|---|
| *H01M 50/46* | (2021.01) | |
| *H01M 10/04* | (2006.01) | |
| *H01M 50/40* | (2021.01) | |
| *H01M 50/477* | (2021.01) | |
| *H01M 50/474* | (2021.01) | |

(52) U.S. Cl.
CPC ......... *H01M 50/403* (2021.01); *H01M 50/46* (2021.01); *H01M 50/474* (2021.01); *H01M 50/477* (2021.01)

(56) References Cited

OTHER PUBLICATIONS

Oct. 6, 2020, International Preliminary Report on Patentability issued in the International Patent Application No. PCT/JP2019/011902.

\* cited by examiner

APPARATUS AND METHOD FOR MANUFACTURING LAMINATE FOR SECONDARY BATTERY

TECHNICAL FIELD

The present disclosure relates to an apparatus for manufacturing a laminate for a secondary battery and a method for manufacturing a laminate for a secondary battery.

BACKGROUND

Secondary batteries such as lithium ion secondary batteries have characteristics such as compact size, light weight, high energy-density, and the ability to be repeatedly charged and discharged, and are used in a wide range of applications. A secondary battery typically includes battery members such as a positive electrode, a negative electrode, and a separator for separating the positive and negative electrodes from each other to prevent a short-circuit between them.

Here, known structures of secondary batteries include a laminate type secondary battery in which a positive electrode, a separator, and a negative electrode are alternately laminated, as well as a wound type secondary battery in which a positive electrode, a separator, and a negative electrode, all of which are long, are overlapped one another and rolled concentrically. Of these, laminate type secondary batteries have attracted attention in recent years in view of their excellent energy density, safety, quality, and durability.

One method has been proposed as a method for manufacturing a laminate type secondary battery. In this method, a first electrode wrapped with a separator and a second electrode are alternately laminated (see PTL 1, for example). Specifically, in the method of PTL 1, a first band-like electrode web is sandwiched on the both surface thereof by band-like separator webs each having mountain folds provided in the short-hand direction, and the first band-like electrode web and the band-like separator webs are bonded together at the contact portions. The first band-like electrode web and the band-like separator webs are cut at the mountain folds, and a cut piece of the first band-like electrode (first electrode) is sealed at the position where a mountain fold of the separator has been formed. The resulting sealed article of the separator and the first and second electrodes are alternately laminated to manufacture a laminate type second battery.

CITATION LIST

PTL 1: JP 2017-63002 A

SUMMARY

Technical Problem

In the method for manufacturing a laminate type secondary battery described in PTL 1, a laminate of the first electrode and the separator is fabricated by bonding first band-like separator web with the band-like separator web provided with mountain folds, which have been prepared in advance and have substantially equal longitudinal lengths, and cutting the bonded article. Thus, in the technique described in PTL 1, in case where a large number of laminates are needed for a continuous manufacturing of laminate type secondary batteries, operations of preparing, bonding, and cutting members (webs) are required to be repeated. This makes continuous and efficient manufacturing of laminate type secondary batteries very difficult.

One solution to this issue is to use a long electrode web rolled into a roll shape and a long separator web rolled into a roll shape so that a laminate of electrodes and a separator is manufactured in a roll-to-roll manner. Generally, in view of the safety such as prevention of short circuits, a laminate having a separator that is larger than electrodes is demanded for laminate type secondary batteries. However, upon manufacturing of laminates in the roll-to-roll technique, because electrode webs and a separator web are laminated and then cut between cutting positions, the separator would have the same size as the sizes of the electrodes.

Given these circumstances, it could be helpful to provide an method for efficiently manufacturing a laminate for a secondary battery including a separator and electrodes, which in turn enables continuous and efficient manufacturing of laminate type secondary batteries.

Solution to Problem

The present disclosure is directed to advantageously solve the above-mentioned problem, and an apparatus for manufacturing a laminate for a secondary battery according to the present disclosure comprises: an electrode roll of a long electrode web rolled into a roll shape; a separator roll of a long separator web rolled into a roll shape; a lamination mechanism for laminating the separator web fed out from the separator roll and the electrode web fed out from the electrode roll while causing the separator web to be bent or curled to form a protruding portion extending across an entire width of the separator web so that the protruding portion is disposed so as to oppose to the electrode web; and a cutting mechanism for cutting at least the electrode web portion in a laminated article of the separator web and the electrode web at a position where the protruding portion has been provided. By providing the lamination mechanism and the cutting mechanism for laminating the separator web fed out from the separator roll and the electrode web fed out from the electrode roll and cutting them in the above-mentioned manner, continuous manufacturing of laminates for secondary batteries can be achieved. In addition, the lamination mechanism laminates the electrode web and the separator web that has been provided with the protruding portion (bent portion or curled portion), and the cutting mechanism cuts at least the electrode web portion at the position where the protruding portion has been provided. This makes it possible to produce a laminate for a secondary battery having a separator that is larger than electrodes. As a result, efficient manufacturing of laminates for secondary batteries can be achieved, which in turn enables continuous and efficient manufacturing of laminate type secondary batteries.

Here, in the apparatus for manufacturing a laminate for a secondary battery of the present disclosure, preferably, the lamination mechanism comprises a pressing device comprising a separator web side holding member and an electrode web side holding member for sandwiching the separator web and the electrode web to laminate the separator web and the electrode web, and the separator web side holding member comprises a recessed portion shaped so as to correspond to the protruding portion, and a suctioning portion for suctioning to hold the separator web into the recessed portion. The separator web side holding member having the recessed portion and the suctioning portion can more efficiently achieve continuous lamination of the electrode web and the separator web that has been provided with the protruding portion (bent portion or curled portion).

Further, in the apparatus for manufacturing a laminate for a secondary battery of the present disclosure, preferably, the separator web side holding member and the electrode web side holding member are pressing rollers. The pressing rollers facilitate continuous lamination of the separator web and the electrode web more efficiently.

Even further, in the apparatus for manufacturing a laminate for a secondary battery of the present disclosure, preferably, the separator web side holding member comprises a plurality of recessed portions that are arranged so as to be parallel to each other, and surface areas of the recessed portions gradually increase or gradually decrease toward a direction in which the recessed portions are arranged so as to be parallel to each other. The separator web side holding member having the plurality of recessed portions the surface areas of which gradually increase or gradually decrease toward the direction in which they are arranged so as to be parallel to each other can provide a laminate in which a plurality of electrodes are laminated to a long separator so that the distances between the electrodes gradually increase or gradually decrease. Such a laminate allows for efficient and easy manufacturing of a laminate type secondary battery.

Still further, in the apparatus for manufacturing a laminate for a secondary battery of the present disclosure, preferably, the protruding portions comprise a first protruding portion and a second protruding portion extending across the entire width of the separator web, and a valley portion located between the first protruding portion and the second protruding portion. The protruding portions provided with the first protruding portion, the second protruding portion, and the valley portion can facilitate cutting of the laminated article of the separator web and the electrode web at the valley portion.

Additionally, the present disclosure is directed to advantageously solve the above-mentioned problem, and a method for manufacturing a laminate for a secondary battery of the present disclosure comprises the steps of: (A) laminating a separator web fed out from a separator roll formed by rolling the long separator web into a roll shape and an electrode web fed out from an electrode roll formed by rolling the long electrode web into a roll shape, while causing the separator web to be bent or curled to form a protruding portion extending across an entire width of the separator web so that the protruding portion is disposed so as to oppose to the electrode web; and (B) cutting at least the electrode web portion in a laminated article of the separator web and the electrode web produced in the step (A), at a position where the protruding portion has been provided. By laminating the separator web fed out from the separator roll and the electrode web fed out from the electrode roll and cutting them in the above-mentioned manner, continuous manufacturing of laminates for secondary batteries can be achieved. In addition, the electrode web is laminated with the separator web which has been provided with the protruding portion (bent portion or curled portion) in the step (A), and at least the electrode web portion is cut at the position where the protruding portion has been provided, in the step (B). This makes it possible to produce a laminate for a secondary battery having a separator that is larger than electrodes. As a result, efficient manufacturing of laminates for secondary batteries can be achieved, which in turn enables continuous and efficient manufacturing of laminate type secondary batteries.

Here, in the method for manufacturing a laminate for a secondary battery of the present disclosure, preferably, the step (A) comprises using an electrode web side holding member and a separator web side holding member comprising a recessed portion shaped so as to correspond to the protruding portion, and a suctioning portion for suctioning to hold the separator web into the recessed portion, to laminate the separator web and the electrode web by sandwiching the separator web and the electrode web with the electrode side pressing member and the separator side pressing member while suctioning to hold the separator web into the recessed portion. The separator web side holding member having the recessed portion and the suctioning portion can more efficiently achieve continuous lamination of the electrode web and the separator web that has been provided with the protruding portion (bent portion or curled portion).

Further, in the method for manufacturing a laminate for a secondary battery of the present disclosure, preferably, the separator web side holding member and the electrode web side holding member are pressing rollers. The pressing rollers facilitate continuous lamination of the separator web and the electrode web more efficiently.

Even further, in the manufacturing method of a laminate for a secondary battery of the present disclosure, preferably, the step (A) comprises forming a plurality of protruding portions so that surface areas of the protruding portions gradually increase or gradually decrease toward a feed direction of the separator web. Forming the plurality of protruding portions so that the surface areas of the protruding portions gradually increase or gradually decrease along the feed direction in the step (A) and cutting the electrode web portion in the step (B) can provide a laminate in which a plurality of electrodes are laminated to a long separator so that the distances between the electrodes gradually increase or gradually decrease. Such a laminate allows for efficient and easy manufacturing of a laminate type secondary battery.

Still further, in the manufacturing method of a laminate for a secondary battery of the present disclosure, preferably, the protruding portions comprise a first protruding portion and a second protruding portion extending across the entire width of the separator web, and a valley portion located between the first protruding portion and the second protruding portion. The protruding portions provided with the first protruding portion, the second protruding portion, and the valley portion can facilitate cutting of the laminated article of the separator web and the electrode web at the valley portion in the step (B).

Advantageous Effect

The present disclosure enables efficient manufacturing of laminates for secondary batteries each having a separator and electrodes, which in turn enables continuous and efficient manufacturing of laminate type secondary batteries.

DETAILED DESCRIPTION

A method for manufacturing a laminate for a secondary battery of the present disclosure can be used to manufacture a laminate for a secondary battery by using an apparatus for manufacturing a laminate for a secondary battery of the present disclosure, for example. The manufactured laminate for a secondary battery can be suitably used for manufacturing a laminate type secondary battery.

Here, in the apparatus and the method for manufacturing a laminate for a secondary battery of the present disclosure, in general, laminates for secondary batteries are continuously manufactured using an electrode roll of a long electrode web rolled into a roll shape, and a separator roll of a long separator web rolled into a roll shape. Specifically, in the manufacturing apparatus and the manufacturing method of the present disclosure, the separator web fed out from the separator roll and the electrode web fed out from the electrode roll are laminated in the state where the separator web is bent or curled to form a protruding portion extending across the entire width of the separator web so that the protruding portion is disposed so as to oppose to the electrode web, using a lamination mechanism, for example, to produce a laminated article of the separator web and the electrode web. Then, the separator web and the electrode web or only the electrode web are cut with a cutting mechanism, for example, at the position where the protruding portion has been provided to manufacture a laminate for a secondary battery.

<Electrode Web>

The electrode web is not particularly limited, and can be an electrode web produced by forming an electrode mixed material layer containing an electrode active material and a binder on one or both surfaces of a long current collector, for example. The materials of the current collector and the electrode mixed material layers can be any of known materials.

<Separator Web>

The separator web is not particularly limited, and can be a long porous member made of an organic material, such as a fine porous membrane or a nonwoven fabric containing a resin, for example, a polyolefin resin (e.g., polyethylene or polypropylene), an aromatic polyamide resin, or the like.

Note that the separator web preferably has a tensile elastic modulus of 400 MPa or more and 4500 MPa or less in the direction where the separator web is fed out from the separator roll (feed direction). The thickness of the separator web is typically 0.5 µm or more and preferably 1 µm or more, and is typically 40 µm or less, preferably 30 µm or less, and more preferably 20 µm or less. Here, in the present disclosure, the term "tensile elastic modulus of a separator web" refers to the tensile elastic modulus of the separator web measured at a temperature of 23° C. in accordance with JIS K7127.

<Laminated Article>

Figure 1A:
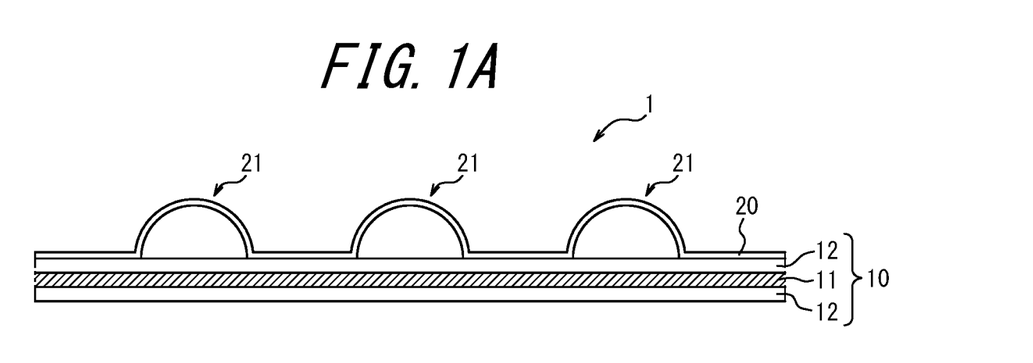
FIG. 1(a) is a cross-sectional view of one example of a laminated article of a separator web and an electrode web taken along the longitudinal direction thereof, (b) is a cross-sectional view of another example of a laminated article of separator webs and an electrode web taken along the longitudinal direction thereof, (c) is a cross-sectional view of another example of a laminated article of a separator web and an electrode web taken along the longitudinal direction thereof.
Figure 1B:
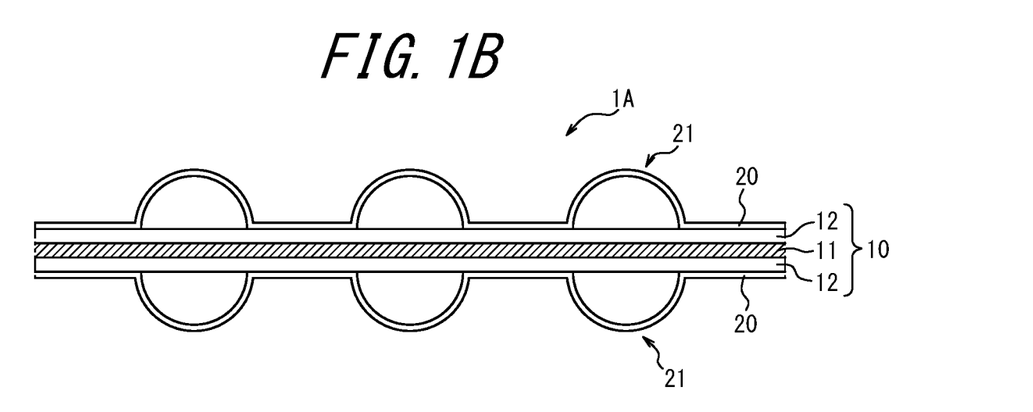
Figure 1C:
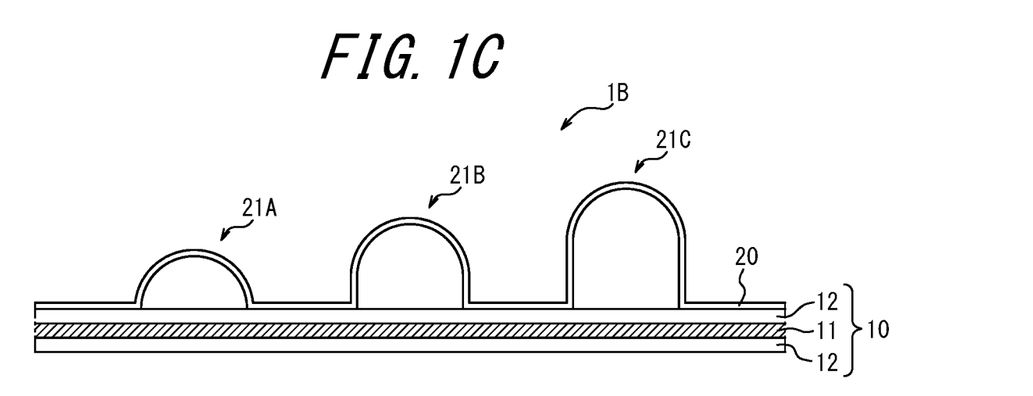

A laminated article formed from an electrode web and a separator web described above in the manufacturing apparatus and the manufacturing method of the present disclosure is not particularly limited, and has a cross-sectional structure as illustrated in FIG. 1(a) to (c) along the longitudinal direction thereof, for example.

Here, a laminated article 1 illustrated in FIG. 1(a) has a structure in which a separator web 20 which is provided with a plurality of protruding portions (curled portions) 21 in semicircular cross-sectional shapes extending across the entire width at predetermined intervals is laminated to one surface (upper side in FIG. 1(a)) of an electrode web 10 having electrode mixed material layers 12 formed on the both surfaces of a current collector 11. Note that the separator web 20 is bonded to the electrode web 10 at intervals between the protruding portions 21.

Further, a laminated article 1A illustrated in FIG. 1(b) has a structure in which separator webs 20 which are each provided with a plurality of protruding portions (curled portions) 21 in semicircular cross-sectional shapes extending across the entire widths at predetermined intervals are laminated to the both surfaces of an electrode web 10 having electrode mixed material layers 12 formed on the both surfaces of a current collector 11. In the laminated article 1A, the positions of the protruding portions 21 of the separator web 20 laminated to one surface of the electrode web 10 coincide with the positions of the protruding portions 21 of the separator web 20 laminated to the other surface of the electrode web 10. In other words, the protruding portions 21 of the separator web 20 laminated to one surface of the electrode web 10 and the protruding portions 21 of the separator web 20 laminated to the other surface of the electrode web 10 are located so as to oppose to each other having the electrode web 10 interposed therebetween. Further, the separator webs 20 are bonded to the electrode web 10 at intervals between the protruding portions 21.

Even further, a laminated article 1B illustrated in FIG. 1(c) has a structure in which a separator web 20 which is provided with a plurality of protruding portions (curled portions) 21 in semicircular cross-sectional shapes extending across the entire width at predetermined intervals is laminated to one surface (upper side in FIG. 1(c)) of an electrode web 10 having electrode mixed material layers 12 formed on the both surfaces of a current collector 11. The laminated article 1B is provided with repeated patterns of a set of protruding portions 21 having the sizes increasing from one side (left side in FIG. 1(c)) toward the other side (right side in FIG. 1(c)) in the longitudinal direction (for example, a set of three protruding portions 21A, 21B, and 21C of which sizes gradually increase in the illustrated example). Note that the separator webs 20 are bonded to the electrode web 10 at intervals between the protruding portions 21A, 21B, and 21C.

Although the electrode web 10 has the electrode mixed material layers 12 on the both surfaces of the current collector 11 in FIG. 1(a) to (c), the electrode web may have an electrode mixed material layer provided only on one surface of the current collector.

Figure 6A:
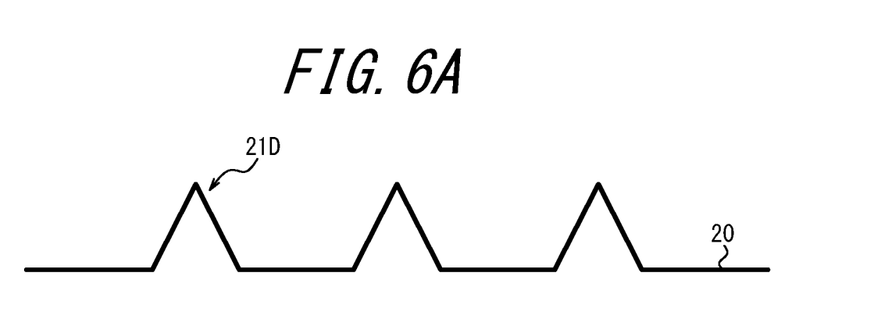
FIG. 6(a) to (c) are cross-sectional views of separator webs taken along the longitudinal direction thereof, illustrating modifications to shapes of protruding portions formed by causing the separator webs to be bent or curled.
Figure 6B:
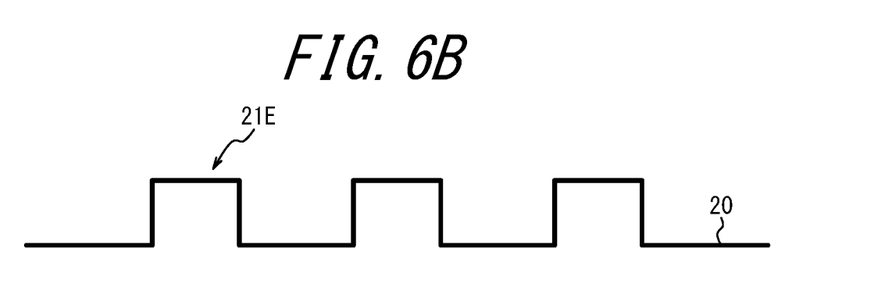
Figure 6C:
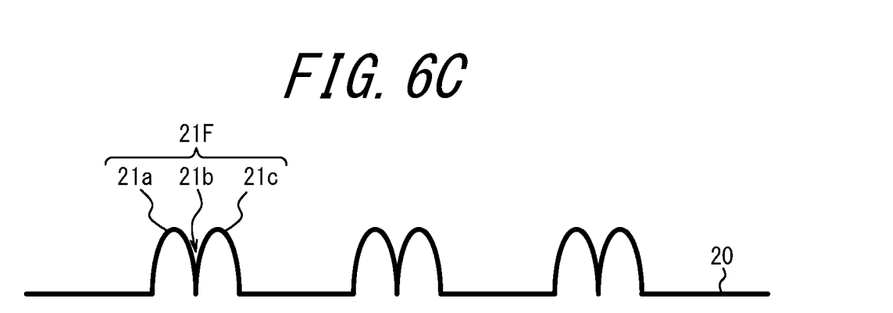

Further, although the protruding portions 21 have semi-circular cross-sectional shapes in FIG. 1(a) to (c), the protruding portions can have any shapes, such as the shapes as illustrated in FIG. 6(a) to (c). Here, protruding portions 21D illustrated in FIG. 6(a) have triangular shapes, protruding portions 21E illustrated in FIG. 6(b) have square shapes, and protruding portions 21F illustrated in FIG. 6(c) have first protruding portions 21a, second protruding portions 21c, and valley portions 21b located between the first protruding portions 21a and the second protruding portions 21c. Of these, the first protruding portions 21a and the second protruding portions 21c adjacent to each other, and the valley portions 21b located between the first protruding portions 21a and the second protruding portions 21c as illustrated in FIG. 6(c) facilitate cutting of the separator web 20 at the valley portions 21b.

<Laminate for Secondary Battery>

A laminate for a secondary battery which is produced by cutting at least the electrode web portion in the above-mentioned laminated article at the position where a protruding portion has been provided in the manufacturing apparatus and the manufacturing method of the present disclosure has a structure in which a separator made of a cut piece of a separator web and greater than an electrode is laminated to one or both surfaces of an electrode made of a cut piece of an electrode web, or has a structure in which a plurality of electrodes made of cut pieces of the electrode web are laminated to one surface of a long separator made of a cut piece of the separator web. Specifically, the structure of the laminate for a secondary battery is not particularly limited, and the laminate for a secondary battery has a cross-sectional structure as the one illustrated in FIG. 2(a) or (b) along the lamination direction thereof, or a cross-sectional structure as the one illustrated in FIG. 3 along the longitudinal direction thereof, for example.

Figure 2A:
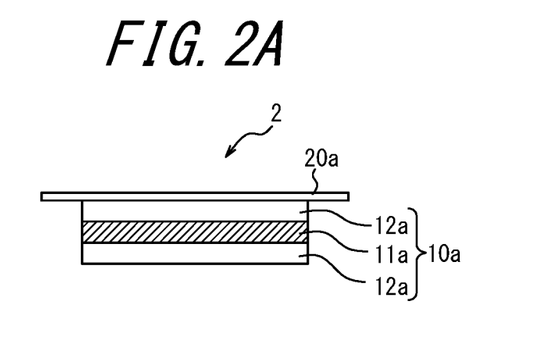
FIG. 2(a) is a cross-sectional view of an example of a laminate for a secondary battery taken along the lamination direction thereof, and (b) is a cross-sectional view of another example of a laminate for a secondary battery taken along the lamination direction thereof.
Figure 2B:
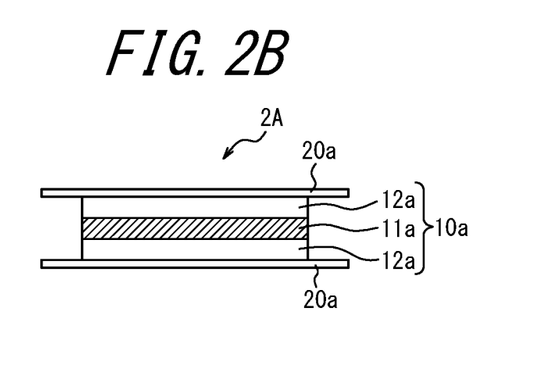

Here, a laminate 2 for a secondary battery illustrated in FIG. 2(a) is produced by cutting the electrode web 10 and the separator web 20 of the laminated article 1 illustrated in FIG. 1(a) at substantially centers (apexes) of the protruding portions 21, for example. The laminate 2 for a secondary battery includes an electrode 10a that is made of a cut piece of the electrode web 10 and has electrode mixed material layers 12a provided on the both surfaces of a current collector 11a, and a separator 20a that is made of a cut piece of the separator web 20, is greater than the electrode 10a, and is laminated to one surface (the upper side in FIG. 2(a)) of the electrode 10a.

Note that each of the lengths of the protrusions of the separator 20a protruding from the both ends of the electrode 10a in FIG. 2(a) is about a half of the difference between the length of a protruding portion 21 in the laminated article 1 which has been cut, and the length of that electrode web at the position opposite to that protruding portion 21.

Further, a laminate 2A for a secondary battery illustrated in FIG. 2(b) is produced, for example, by cutting the electrode web 10 and the separator webs 20 of the laminated article 1A illustrated in FIG. 1(b) at substantially centers (apexes) of the protruding portions 21. The laminate 2A for a secondary battery includes an electrode 10a that is made of a cut piece of the electrode web 10 and has electrode mixed material layers 12a provided on the both surfaces of a current collector 11a, and separators 20a that are made of cut pieces of the separator web 20, are greater than the electrode 10a, and are laminated to the both surfaces of the electrode 10a.

Note that each of the lengths of the protrusions of each separator 20a protruding from the both ends of the electrode 10a in FIG. 2(b) is about a half of the difference between the length of a protruding portion 21 in the laminated article 1 which has been cut, and the length of the electrode web at the position opposite to that protruding portion 21.

The laminate 2 for a secondary battery and the laminate 2A for a secondary battery described above can be laminated as illustrated in FIG. 4, for example, to produce an electrode structure, which can be used for a laminate type secondary battery.

Figure 4:
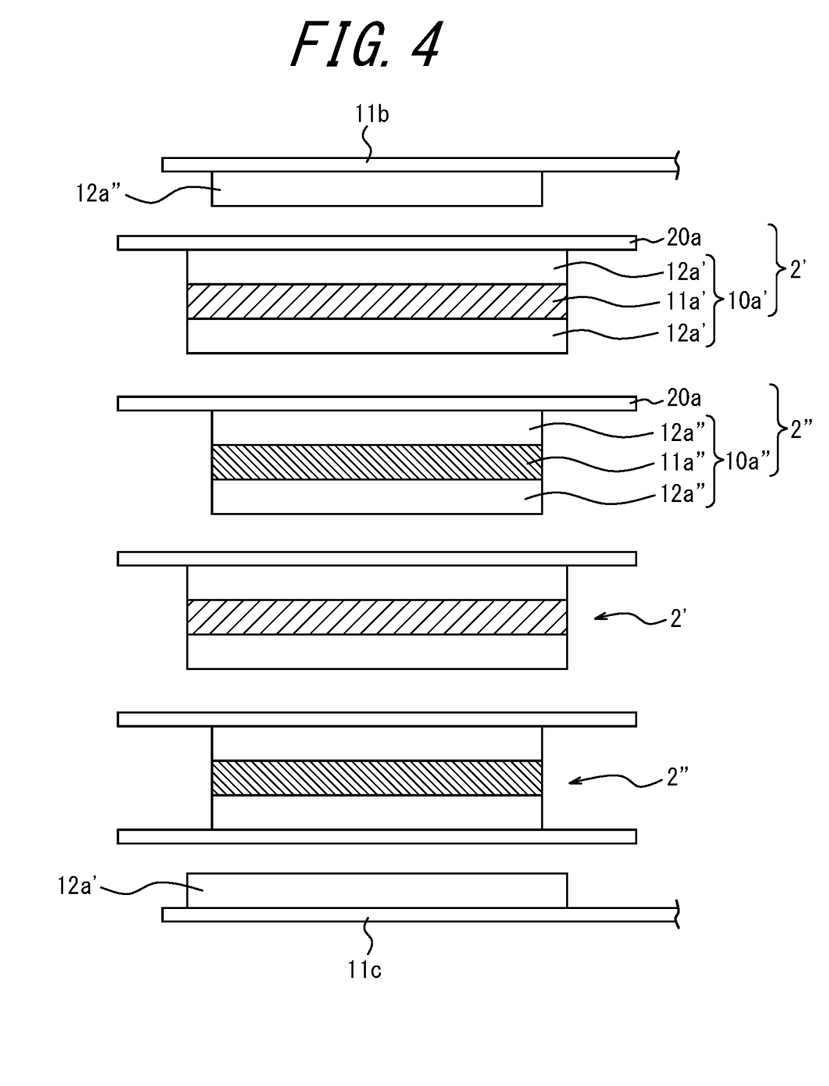
FIG. 4 is an explanatory diagram illustrating an example of the structure of an electrode structure formed using the laminate for a secondary battery illustrated in FIG. 2.

Here, in FIG. 4, the reference symbols 2', 10a', 11a', and 12a' denote negative electrode laminates, negative electrodes, negative electrode current collectors, and negative electrode mixed material layers, respectively. The reference symbols 2", 10a", 11a", and 12a" denote positive electrode laminates, positive electrodes, positive electrode current collectors, and positive electrode mixed material layers, respectively. The reference symbols 20a denote separators. In this example, the positive electrodes 10a" are made smaller than the negative electrodes 10a' for the purpose of increasing the safety of a secondary battery. In addition, the reference symbol 11b denotes a positive electrode current collector provided with a current lead-out terminal, and the reference symbol 11c denotes a negative electrode current collector provided with a current lead-out terminal.

Figure 3:
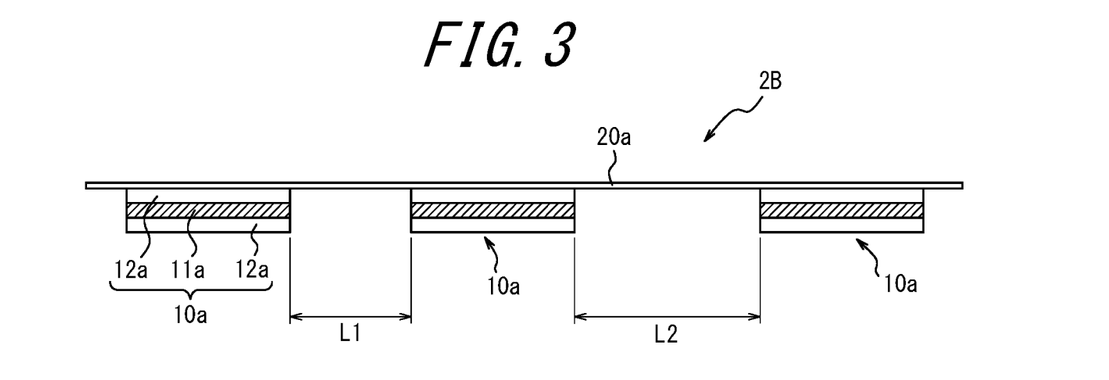
FIG. 3 is a cross-sectional view of another example of a laminate for a secondary battery taken along the longitudinal direction thereof.

Further, a laminate 2B for a secondary battery illustrated in FIG. 3 is produced from the laminated article 1B illustrated in FIG. 1(c), for example, by cutting the electrode web 10 and the separator web 20 at substantially centers (apexes) of the protruding portions 21A and cutting only the electrode web 10 at positions opposite to the substantially centers (apexes) of the protruding portions 21B and the protruding portion 21C. The laminate 2B for a secondary battery has a structure in which a plurality of (three on the lower side in the illustrated example) electrodes 10a that are made of cut pieces of the electrode web 10 and each have electrode mixed material layers 12a provided on the both surfaces of a current collector 11a are laminated to one surface of a long separator 20a made of a cut piece of the separator web 20.

Note that the distances L1 and L2 between the electrodes 10a in FIG. 3 correspond to the lengths of the protruding portions 21B and 21C which have not been cut, respectively, of the laminated article 1B.

Figure 5:
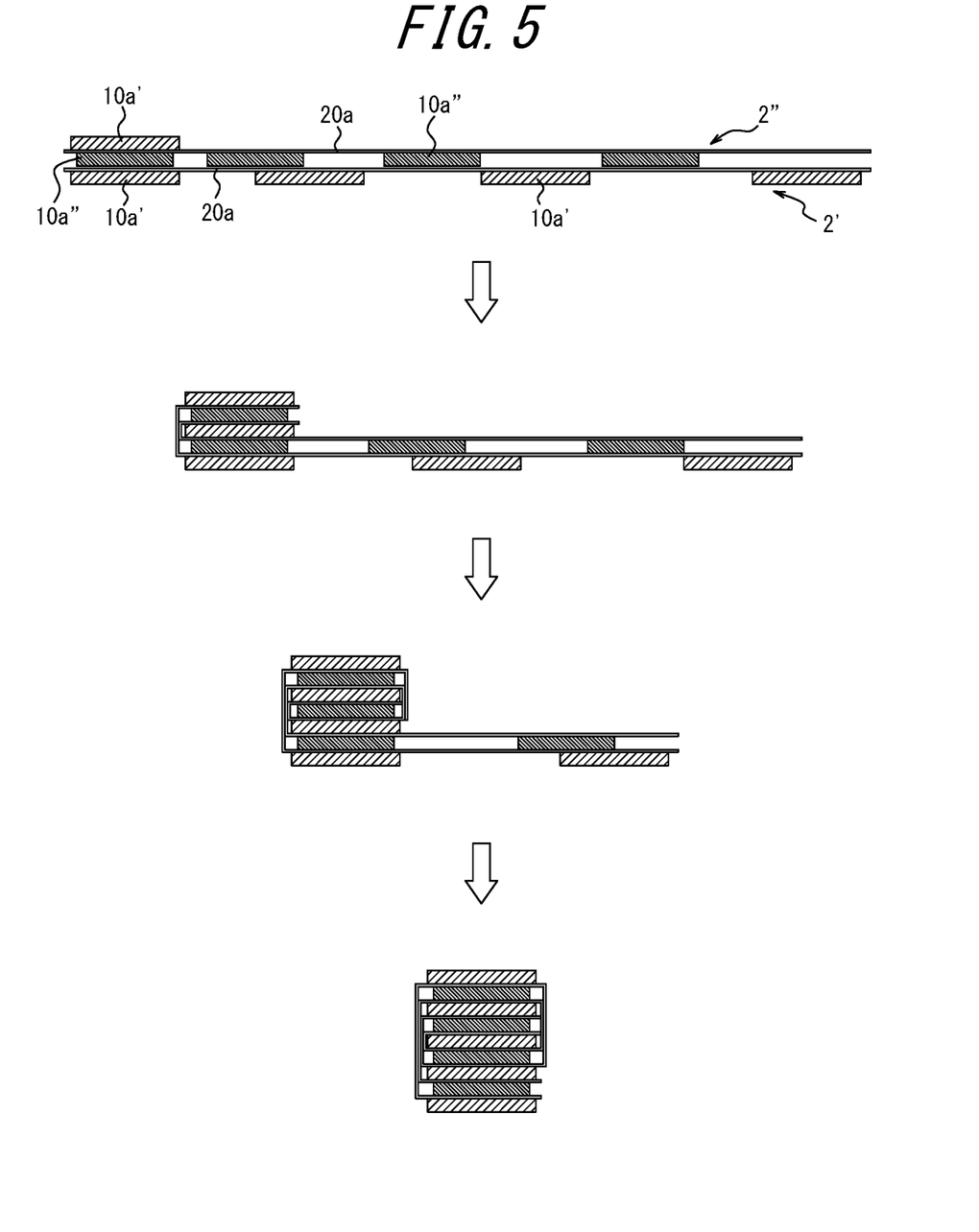
FIG. 5 is an explanatory diagram illustrating a process of forming an electrode structure using the laminate for a secondary battery illustrated in FIG. 3.

The laminate 2B for a secondary battery described above can be laminated and wound as illustrated in FIG. 5, for example, to produce an electrode structure which can be used for a laminate type secondary battery. This electrode structure has a structure in which n first electrodes (negative electrodes or positive electrodes; negative electrodes 10a' in the illustrated example) and n−1 second electrodes (positive electrodes or negative electrodes; positive electrodes 10a" in the illustrated example) are alternately laminated. Specifically, the electrode structure has a first laminate in which n−1 first electrodes are laminated to one surface of a long separator at predetermined intervals. The electrode structure further has a second laminate in which the n−1 second electrodes are laminated to one surface of a long separator at predetermined intervals, and one first electrode is laminated to the other surface of the separator so as to oppose to the second electrode disposed at one end in the longitudinal direction of the separator. The first laminate and the second laminate are laminated so that the first electrode located at the one end in the longitudinal direction of the first laminate is located so as to oppose to the second electrode located at the one end in the longitudinal direction of the second laminate having the separator of the first laminate interposed therebetween, and are wound toward the other end in the longitudinal direction.

In other words, the electrode structure illustrated in FIG. 5 has the first laminate in which the plurality of first electrodes are laminated to the one surface of the first long separator so as to be spaced apart from each other in the longitudinal direction of the first separator. The electrode structure further has the second laminate in which the plurality of second electrodes are laminated to the one surface of the second long separator so as to be spaced apart from each other in the longitudinal direction of the second separator, and the first electrode is laminated to the other surface of the second separator so as to oppose to the second electrode located at the one end in the longitudinal direction of the second separator. The second separator, the second electrode, the first separator, and the first electrode are stacked in this order from the first electrode in the second laminate toward one side in the lamination direction. In addition, the second separator, the second electrode, the first separator, and the first electrode are stacked in this order from the first electrode in the second laminate toward the other side in the lamination direction. In addition, the first separator and the second separator are wound about the first electrode in the second laminate as the winding center.

Upon forming an electrode structure, a separator may be slackened or may be pulled to stretch the separator while the separator is wound. Typically, the "predetermined spacing" between adjacent electrodes is set to be equal to or greater than the total thickness of all of an electrode and a separator sandwiched between those adjacent electrodes upon winding, and is the length in which a first electrode and a second electrode can be vertically aligned.

Here, in FIG. 5, the reference symbols 2', 10a', 2", 10a", and 20a denote a negative electrode laminate, negative electrodes, a positive electrode laminate, positive electrodes, and separators, respectively. In this example, the negative electrode 10a' that is located at the one end of the positive electrode laminate 2" and is located so as to oppose to the positive electrode 10a" having the separator 20a interposed therebetween can be disposed on the separator 20a using any of techniques used for manufacturing of secondary batteries. Further, the distances between respective electrodes (negative electrodes 10a' and positive electrodes 10a") can be set to equal to or greater than the total thickness of all of a negative electrode 10a', a positive electrode 10a", and a separator 20a sandwiched between these electrodes upon winding, and is the length in which a negative electrode 10a' and a positive electrode 10a" can be vertically aligned. Also in this example, the positive electrodes 10a" are made smaller than the negative electrodes 10a' for the purpose of increasing the safety of a secondary battery.

<Apparatus and Method for Manufacturing Laminate for Secondary Battery>

Figure 7:
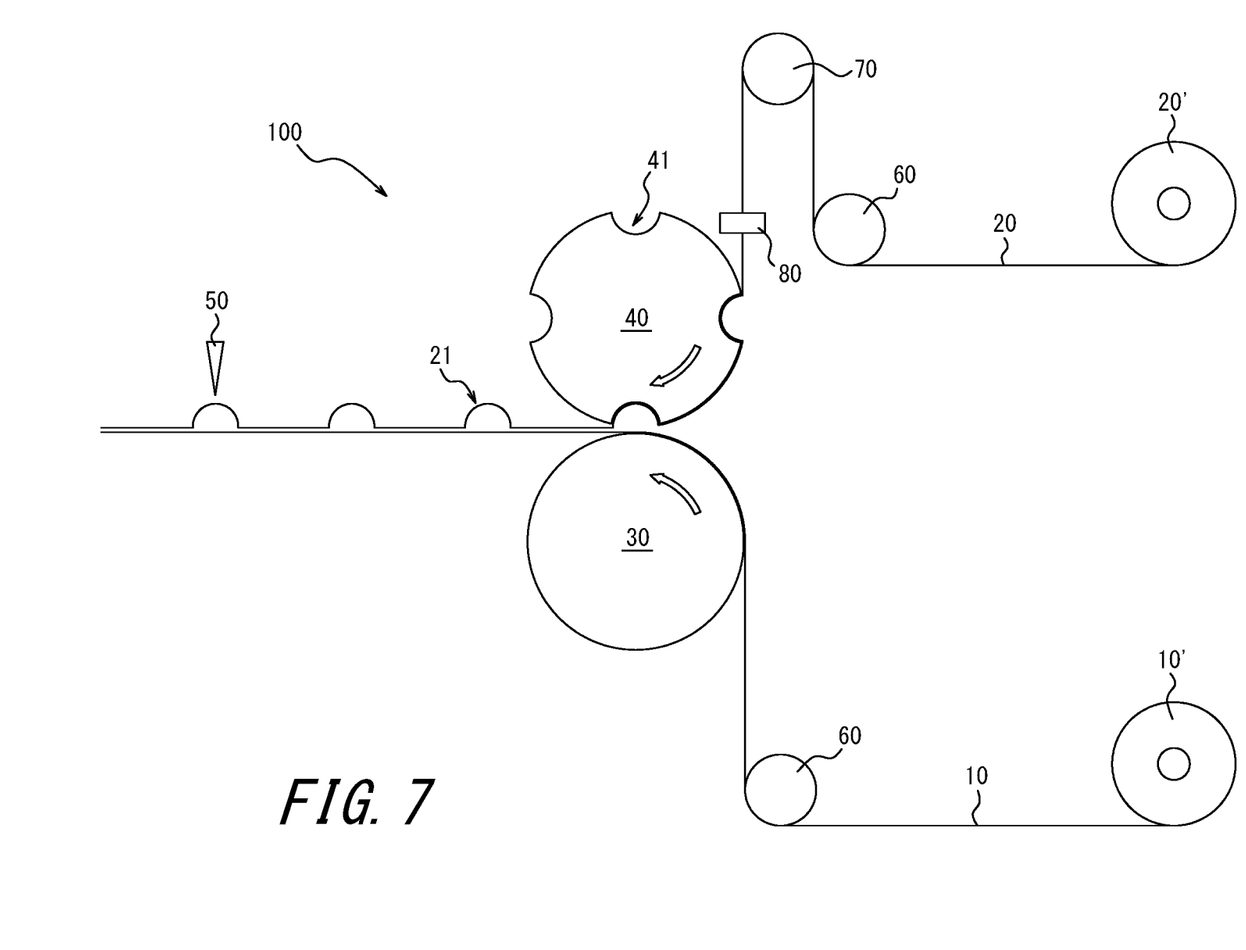
FIG. 7 is an explanatory diagram illustrating a schematic configuration of an example of an apparatus for manufacturing a laminate for a secondary battery.

Laminates for secondary batteries as described above can be manufactured using a manufacturing apparatus 100 as illustrated in FIG. 7, for example.

The manufacturing apparatus 100 illustrated in FIG. 7 includes an electrode roll 10' of a long electrode web 10 rolled into a roll shape, a separator roll 20' of a long separator web 20 rolled into a roll shape, a rubber roller 30 and a suction roller 40 which serve as pressing rollers for sandwiching the electrode web 10 and the separator web 20 to pressing them, and a cutting mechanism 50 for cutting a laminated article of the separator web 20 and the electrode web 10. The manufacturing apparatus 100 also includes feed rollers 60 for feeding the electrode web 10 and the separator web 20, a tension damper 70 for adjusting the tension of the separator web 20, and an acceleration device 80 for increasing the feed speed of the separator web 20. According to the manufacturing apparatus 100, a laminated article 1 as illustrated in FIG. 1(a) can be formed and be cut by the cutting mechanism 50, for example, to thereby produce a laminate 2 for a secondary battery as illustrated in FIG. 2(a).

Figure 8:
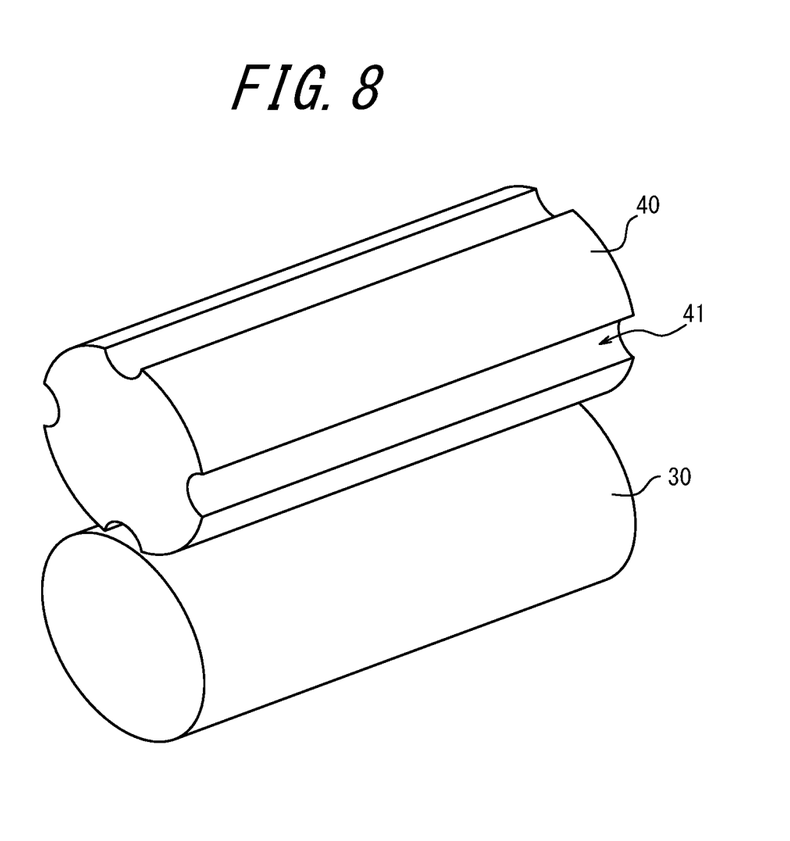
FIG. 8 is an enlarged perspective view illustrating pressing rollers in the manufacturing apparatus illustrated in FIG. 7.

Here, the suction roller 40 has recessed portions 41 each shaped (into a semicircular shape) so as to correspond to protruding portions 21 to be formed in a laminated article 1 and to be cut in the manufacturing apparatus 100, and suctioning portions (not illustrated) for suctioning to hold the separator web 20 into the recessed portions 41. As illustrated in an enlarged view of the rubber roller 30 and the suction roller 40 in FIG. 8, the recessed portions 41 in the suction roller 40 are provided across the entire width of the suction roller 40.

The tension damper 70, the acceleration device 80, the rubber roller 30, and the suction roller 40 function as a lamination mechanism for laminating the separator web 20 fed out from the separator roll 20' and the electrode web 10 fed out from the electrode roll 10' while suctioning the separator 20 into the recessed portions 41 in the suction roller 40 to cause the separator 20 to be curled to form protruding portions 21 extending across the entire width of the separator web 20 so that the protruding portions 21 are located so as to oppose to the electrode web 10. In the lamination mechanism, the rubber roller 30 and the suction roller 40 function as a pressing device in which the rubber roller 30 serves as an electrode web side holding member and the suction roller 40 serves as a separator web side holding member.

According to this manufacturing apparatus 100, the separator web 20 fed out from the separator roll 20' and the electrode web 10 fed out from electrode roll 10' are laminated while the separator web 20 is caused to be curled using the recessed portions 41 in the suction roller 40 to form protruding portions 21 extending across the entire width of the separator web 20 so that the protruding portions 21 are located so as to oppose to the electrode web 10 (Step (A)). In addition, a laminated article of the separator web 20 and the electrode web 10 produced in the Step (A) is cut at the positions where the protruding portions 21 have been provided, to thereby produce a laminate 2 for a secondary battery as illustrated in FIG. 2(a) (Step (B)). This enables continuous manufacturing of laminates for secondary batteries each provided with a separator that is larger than electrodes. As a result, continuous and efficient manufacturing of laminate type secondary batteries can be achieved.

Figure 9A:
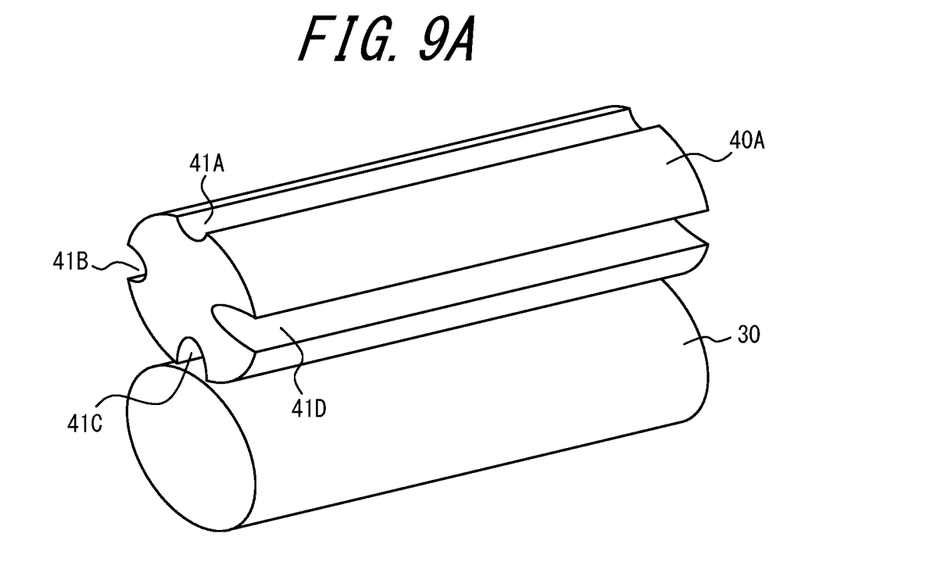
FIG. 9(a) is a perspective view of a first modification to pressing rollers, and (b) is a perspective view of a second modification to pressing rollers.

Here, in the above-mentioned manufacturing apparatus 100, the suction roller 40 having four recessed portions 41 in the same shapes is used so that a laminated article 1 as illustrated in FIG. 1(a) is formed and is cut by the cutting mechanism 50, to thereby manufacture a laminate 2 for a secondary battery as illustrated in FIG. 2(a). Alternatively, for forming a laminated article 1B as illustrated in FIG. 1(c) to thereby manufacture a laminate 2B for a secondary battery as illustrated in FIG. 3, a suction roller 40A as illustrated in FIG. 9(a) may be used in place of the suction roller 40.

The suction roller 40A has a plurality of (four in the illustrated example) recessed portions 41A, 41B, 41C, and 41D that are arranged so as to be parallel to each other in the circumferential direction of the suction roller 40A. The surface areas of the recessed portions 41A, 41B, 41C, and 41D gradually increase or gradually decrease toward the direction in which the recessed portions 41A, 41B, 41C, and 41D are arranged so as to be parallel to each other (the surface areas gradually increase in the counterclockwise direction in the illustrated example). In other words, the sizes of recessed portions 41A, 41B, 41C, and 41D gradually increase in the suction roller 40A.

For manufacturing a laminate 2B for a secondary battery as illustrated in FIG. 3 using the suction roller 40A, for example, the rubber roller 30 and the suction roller 40A laminate the separator web 20 with the electrode web 10 while protruding portions are formed by the recessed portions 41A, 41B, 41C, and 41D. In addition, the cutting mechanism cuts the electrode web 10 and the separator web 20 at the positions where the smallest protruding portions formed with the recessed portion 41A have been provided, and the cutting mechanism cuts only the electrode web 10 at the positions where the protruding portions formed with the recessed portions 41B, 41C, and 41D have been provided. This enables efficient production of the laminate 2B for a secondary battery as illustrated in FIG. 3 to produce an electrode structure as illustrated in FIG. 5, which in turn enables continuous and efficient manufacturing of laminate type secondary batteries.

Note that only the electrode web 10 can be cut by the cutting mechanism by providing a cutting blade on the electrode web 10 side opposite to the separator web 20 side, and moving the cutting blade to a position between the electrode web 10 and a protruding portion of the separator web 20, for example.

Figure 9B:
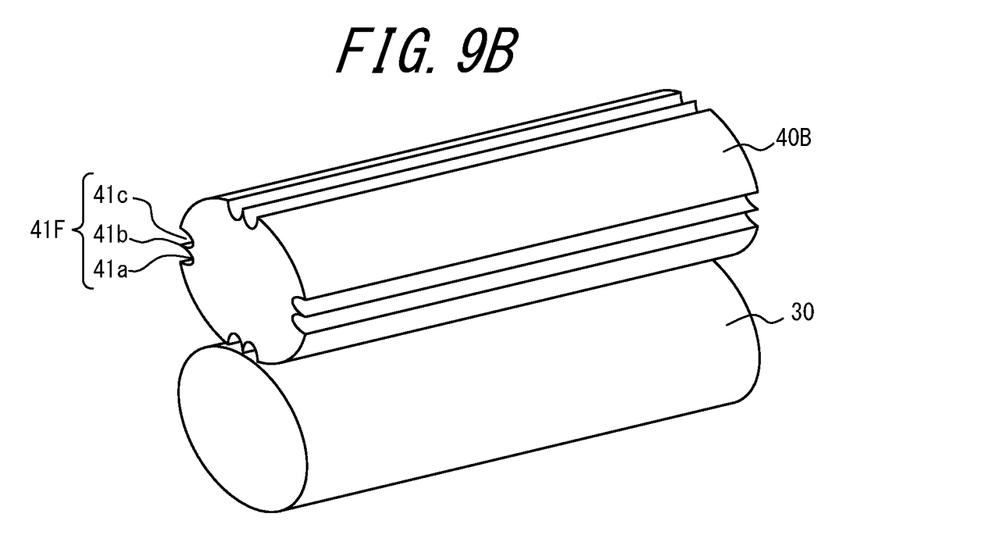

Further, for forming a laminated article having protruding portions 21F having the shape as illustrated in FIG. 6(c) to thereby manufacture a laminate 2 for a secondary battery as illustrated in FIG. 2(a), a suction roller 40B as illustrated in FIG. 9 (b) may be used in place of the suction roller 40.

The suction roller 40B includes first recessed portions 41a and second recessed portions 41c shaped so as to correspond to first protruding portions 21a and second protruding portions 21c, respectively, and recessed portions 41F that are each disposed between a first recessed portion 41a and a second recessed portion 41c adjacent to each other, and are provided with apex portions 41b shaped so as to correspond to valley portions 21b.

For forming a laminated article having a protruding portion 21F having the shape as illustrated in FIG. 6(c) by using the suction roller 40B to thereby manufacture a laminate 2 for a secondary battery as illustrated in FIG. 2(a), for example, the rubber roller 30 and the suction roller 40B laminate the separator web 20 with the electrode web 10 while protruding portions 21F are formed by the recessed portions 41F. In addition, the cutting mechanism cuts the electrode web 10 and the separator web 20 at valley portions 21b of the protruding portions 21F. This enables continuous manufacturing of laminates for secondary batteries each provided with a separator that is larger than electrodes. As a result, continuous and efficient manufacturing of laminate type secondary batteries can be achieved.

Figure 10:
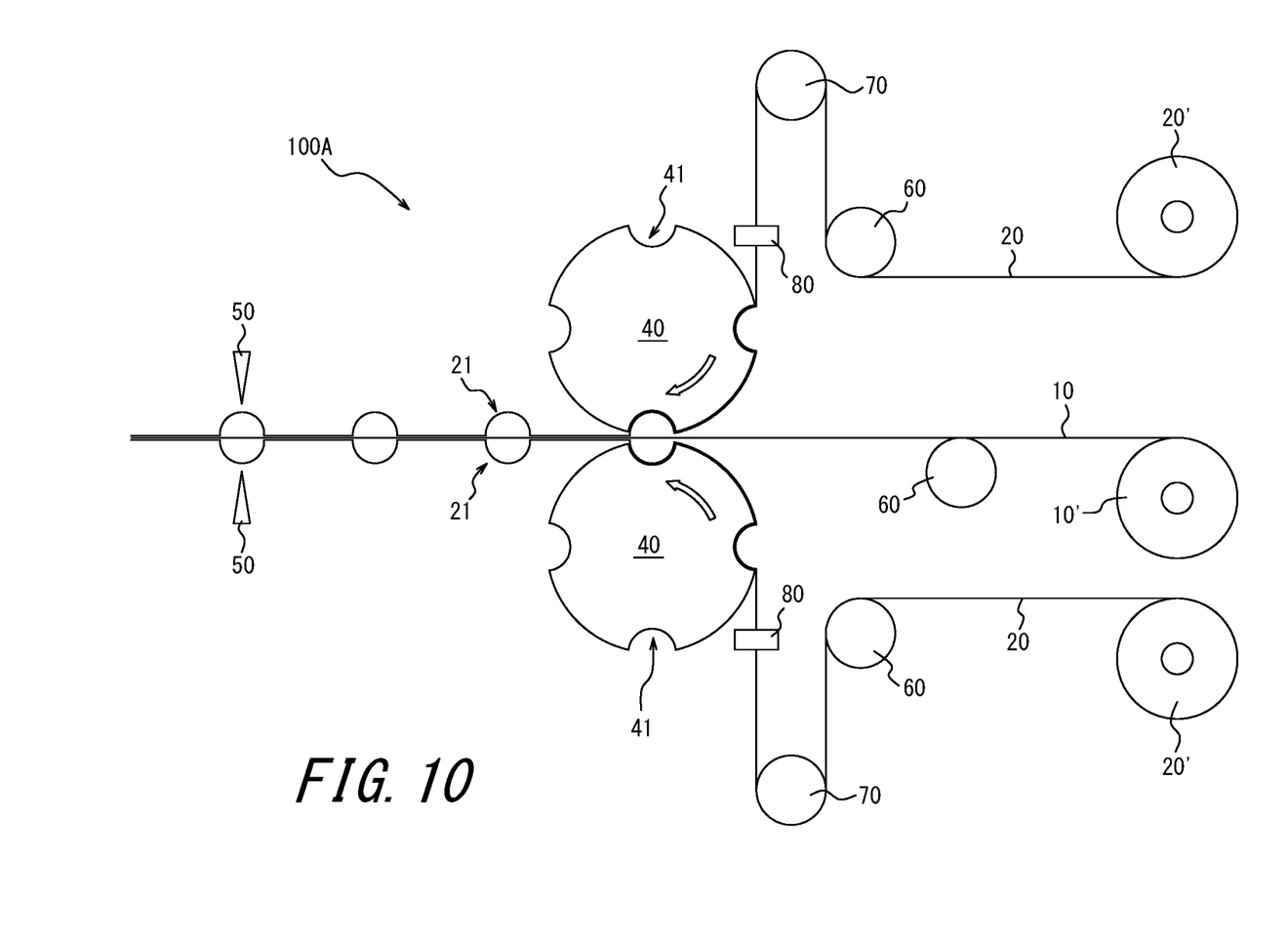
FIG. 10 is an explanatory diagram illustrating a schematic configuration of another example of an apparatus for manufacturing a laminate for a secondary battery.

The description has been made with reference to the example in which a laminated article is formed by laminating the separator web 20 to one surface of the electrode web 10 and is cut by the cutting mechanism, to thereby manufacture a laminate for a secondary battery in which a separator is laminated to one surface of an electrode. However, for forming a laminated article in which separator webs 20 are laminated to the both surfaces of an electrode wed 10 to manufacture a laminate 2A for a secondary battery as illustrated in FIG. 2(b), a manufacturing apparatus 100A as illustrated in FIG. 10 may be used, for example.

Here, elements in FIG. 10 having the same structures as the corresponding elements in FIG. 7 are referenced to by the same reference symbols as those in FIG. 7, and description thereof will be omitted hereinafter.

According to this manufacturing apparatus 100A, separator webs 20 fed out from two separator rolls 20' are laminated with an electrode web 10 fed out from electrode roll 10' positioned between the separator webs 20 while the separator webs 20 are caused to be curled using a pair of suction rollers 40 as pressing rollers to form protruding portions 21 extending across the entire widths of the separator webs 20 so that the protruding portions 21 are located so as to oppose to the electrode web 10 using recessed portions 41 in the suction rollers 40 (Step (A)). In addition, a laminated article of the separator webs 20 and the electrode web 10 produced in the Step (A) is cut at the positions where the protruding portions 21 have been provided, to thereby produce a laminate 2A for a secondary battery as illustrated in FIG. 2(b) (Step (B)). This enables continuous manufacturing of laminates for secondary batteries each provided with a separator that is larger than electrodes. As a result, continuous and efficient manufacturing of laminate type secondary batteries can be achieved.

In the manufacturing apparatus 100A, the mechanism to feed the laminated article having protruding portions 21 on the both surfaces is not particularly limited, and the laminated article can be fed using, for example, feed rollers having recessed portions shaped so as to correspond to the shapes of the protruding portions 21, or a lift-up type feeding mechanism, such as air lift rollers.

Although the apparatus and the method for manufacturing a laminate for a secondary battery of the present disclosure have been described with reference to the examples, the apparatus and the method for manufacturing a laminate for a secondary battery of the present disclosure are not limited to the above-mentioned examples.

For example, a mold may be used as a pressing device for holding to laminate the separator web and the electrode web. In this case, the mold portion serving as separator web side holding member may be provided with recessed portions shaped so as to correspond to protruding portions and suctioning portions for suctioning to hold the separator web into the recessed portions.

Further, formation of protruding portions using recessed portions may be carried out by covering the surfaces of the recessed portions with a separator web by means of pressing and/or static electricity. Further, when the separator web is too weak to form a laminated article, to be fed and cut with the shapes of protruding portions being retained, such as in the case where the tensile elastic modulus of the separator web in the feed direction thereof is 400 MPa or more and 4500 MPa or less, and/or in the case where the thickness of the separator web is 0.5 μm or more 40 μm or less, the separator web may be molded while being heated in the recessed portions, or a shape retention member for retaining the shapes of protruding portions may be provided between the separator web and the electrode web.

INDUSTRIAL APPLICABILITY

According to the manufacturing apparatus and manufacturing method of the present disclosure, laminates for secondary batteries each including a separator and electrodes can be efficiently manufactured, which in turn enables continuous and efficient manufacturing of laminate type secondary batteries.

REFERENCE SIGNS LIST 1, 1A, 1B Laminated article
2, 2A, 2B Laminate for secondary battery
2' Negative electrode laminate
2" Positive electrode laminate
10 Electrode web
10a Electrode
10a' Negative electrode
10a" Positive electrode
10' Electrode roll
11 Current collector
11a Current collector
11a' Negative electrode current collector
11a" Positive electrode current collector
11b Positive electrode current collector provided with current lead-out terminal
11c Negative electrode current collector provided with current lead-out terminal
12 Electrode mixed material layer
12a Electrode mixed material layer
12a' Negative electrode mixed material layer
12a" Positive electrode composite layer
20 Separator web
20a Separator
20' Separator roll
21 Protruding portion
21A, 21B, 21C, 21D, 21E, 21F Protruding portion
21a First protruding portion
21b Valley portion
21c Second protruding portion
30 Rubber roller
40, 40A, 40B Suction roller
41, 41A, 41B, 41C, 41D, 41F Recessed portion
41a First recessed portion
41b Apex
41c Second recessed portion
50 Cutting mechanism
60 Feed roller
70 Tension damper
80 Acceleration device
100, 100A Manufacturing apparatus

The invention claimed is:

1. An apparatus for manufacturing a laminate for a secondary battery comprising:
an electrode roll of a long electrode web rolled into a roll shape;
a separator roll of a long separator web rolled into a roll shape;
a laminator for laminating the separator web fed out from the separator roll and the electrode web fed out from the electrode roll while causing the separator web to be bent or curled to form a protruding portion extending across an entire width of the separator web so that the protruding portion is disposed so as to oppose to the electrode web; and
a cutter for cutting at least the electrode web portion in a laminated article of the separator web and the electrode web at a position where the protruding portion has been provided.

2. The apparatus for manufacturing a laminate for a secondary battery according to claim 1, wherein
the laminator comprises a pressing device comprising a separator web side holding member and an electrode web side holding member for sandwiching the separator web and the electrode web to laminate the separator web and the electrode web, and
the separator web side holding member comprises a recessed portion shaped so as to correspond to the protruding portion, and a suctioning portion for suctioning to hold the separator web into the recessed portion.

3. The apparatus for manufacturing a laminate for a secondary battery according to claim 2, wherein
the separator web side holding member and the electrode web side holding member are pressing rollers.

4. The apparatus for manufacturing a laminate for a secondary battery according to claim 2, wherein
the separator web side holding member comprises a plurality of recessed portions that are arranged so as to be parallel to each other, and
surface areas of the recessed portions gradually increase or gradually decrease toward a direction in which the recessed portions are arranged so as to be parallel to each other.

5. The apparatus for manufacturing a laminate for a secondary battery according to claim 1, wherein
the protruding portions comprise a first protruding portion and a second protruding portion extending across the entire width of the separator web, and a valley portion located between the first protruding portion and the second protruding portion.

6. A method for manufacturing a laminate for a secondary battery, comprising the steps of:
(A) laminating a separator web fed out from a separator roll formed by rolling the long separator web into a roll shape and an electrode web fed out from an electrode roll formed by rolling the long electrode web into a roll shape, while causing the separator web to be bent or curled to form a protruding portion extending across an entire width of the separator web so that the protruding portion is disposed so as to oppose to the electrode web; and
(B) cutting at least the electrode web portion in a laminated article of the separator web and the electrode web produced in the step (A), at a position where the protruding portion has been provided.

7. The method for manufacturing a laminate for a secondary battery according to claim 6, wherein
the step (A) comprises using an electrode web side holding member and a separator web side holding member comprising a recessed portion shaped so as to correspond to the protruding portion, and a suctioning portion for suctioning to hold the separator web into the recessed portion, to laminate the separator web and the electrode web by sandwiching the separator web and the electrode web with the electrode side pressing member and the separator side pressing member while suctioning to hold the separator web into the recessed portion.

8. The method for manufacturing a laminate for a secondary battery according to claim 7, wherein
the separator web side holding member and the electrode web side holding member are pressing rollers.

9. The method for manufacturing a laminate for a secondary battery according to claim 6, wherein
the step (A) comprises forming a plurality of protruding portions so that surface areas of the protruding portions gradually increase or gradually decrease toward a feed direction of the separator web.

10. The method for manufacturing a laminate for a secondary battery according to claim 6, wherein
the protruding portions comprise a first protruding portion and a second protruding portion extending across the entire width of the separator web, and a valley portion located between the first protruding portion and the second protruding portion.

* * * * *